Aug. 7, 1962   F. L. GOLIGHTLY   3,047,949
MEANS CONTROLLING THE OPENING OF PRUNING SHEARS AND THE LIKE
Filed Dec. 29, 1960   2 Sheets-Sheet 1
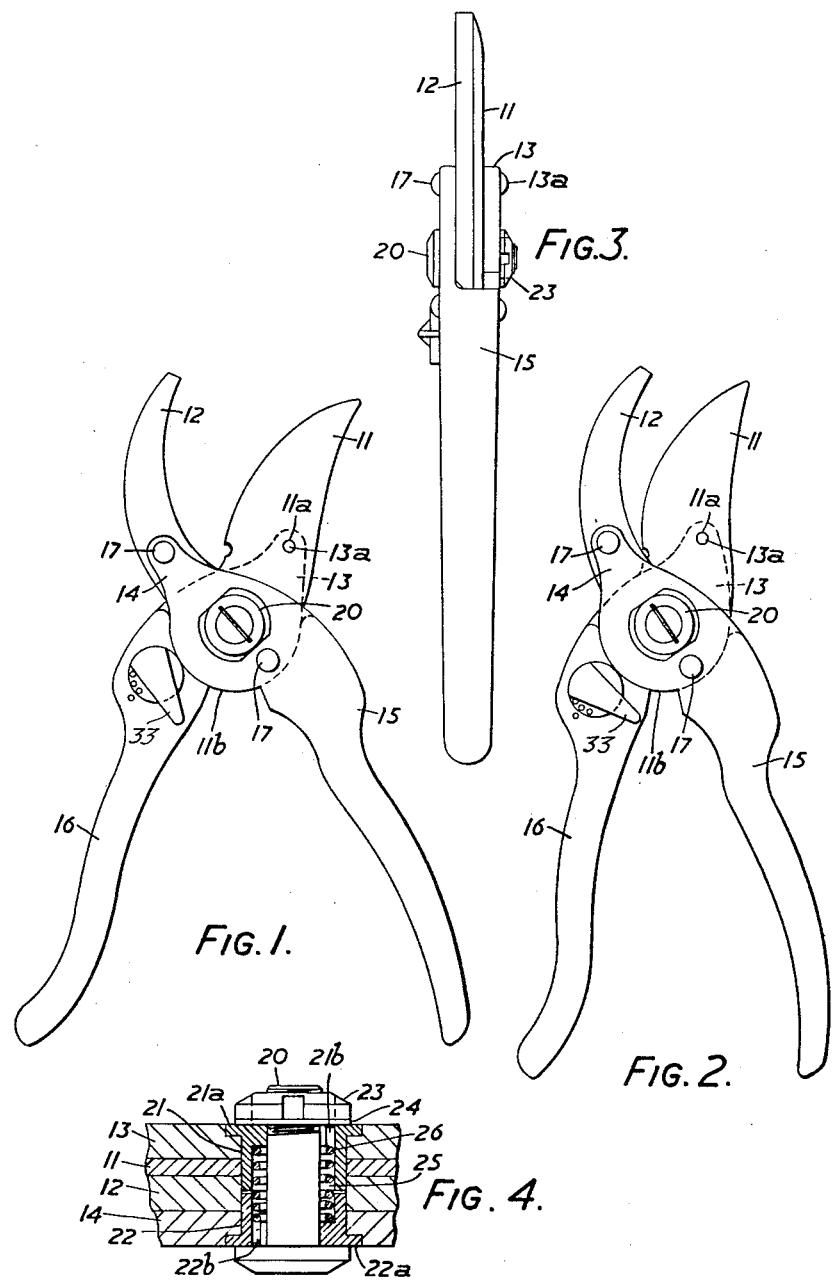
INVENTOR
FRANK LESLIE GOLIGHTLY
BY
Mason, Mason, & Albright
ATTORNEYS

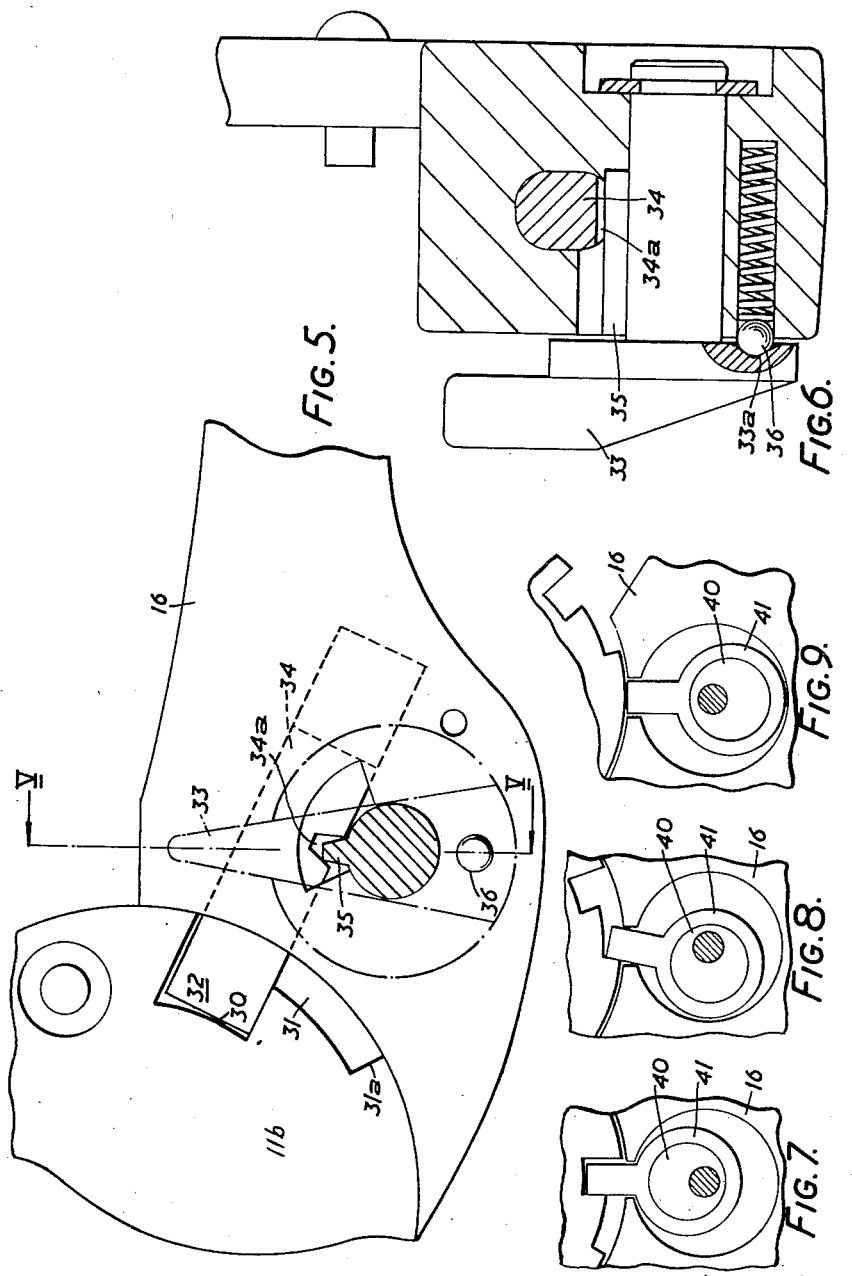

United States Patent Office 3,047,949
Patented Aug. 7, 1962

3,047,949
MEANS CONTROLLING THE OPENING OF PRUNING SHEARS AND THE LIKE
Francis Leslie Golightly, London, England, assignor to Wilkinson Sword Limited, London, England, a British company
Filed Dec. 29, 1960, Ser. No. 79,273
Claims priority, application Great Britain Dec. 30, 1959
9 Claims. (Cl. 30—271)

This invention relates to pruning shears or secateurs in particular, but is equally applicable to other devices which open and close by pivotal movement.

One of the disadvantages associated with many forms of pruning shear is that whilst it is normally used for severing small branches, the blades must be capable of opening sufficiently to enclose a large branch for severing, and the spring urging open the blades and likewise the handles, will on release urge them into this fully open position. The present invention aims to overcome this difficulty.

The present invention provides a pair of members pivotally movable relatively to one another and means for varying the angular range of relative movement therebetween.

The present invention also provides a pair of pivotally interconnected members and means relatively movable between a first position in which said means lock said members against relative movement, a second position in which said members can be moved over a first angular range of relative movement, and a third position in which said members can be moved over a second angular range of movement which is greater than the first said range of movement.

One embodiment of the present invention will now be particularly described, by way of example only, with reference to the accompanying drawings in which:

FIGURE 1 shows a pruning shear in the fully open position;

FIGURE 2 shows the shear of FIGURE 1 in a restricted open position;

FIGURE 3 is a side view of the shear of FIGURES 1 and 2 when in the closed position;

FIGURE 4 is a sectional view of the pivot assembly of the shear;

FIGURE 5 is a cut-away view on an enlarged scale of a detail of the shear;

FIGURE 6 is a section on the line VI—VI of FIG. 5;

FIGURES 7-9 show a modification of the detail of FIGURE 5 in three different operating positions.

The pruning shear of this embodiment comprises blades 11, 12 supported on blade supporting members 13, 14 which are integral with handles 15, 16. The blade 11 is removably mounted on the supporting member 13 by means of pins 13a which engage in apertures 11a in the blade, only one pin and one aperture being visible. The blade 12 is secured to the member 14 by rivets or pins 17.

The pivot bearing comprises a bolt 20 and collar arrangement comprising a pair of collars or bushes 21, 22 each flanged at one end and each passing through a blade supporting member into its associated blade with the flange resting in a recess in the outer side of the supporting member. One of the bushes extends through its associated blade into the opposite blade thereby providing a pivot for the two blades adjacent their abutting surfaces. The flanges 21a, 22a are pressed towards each other by the bolt passing axially through the bushes and supporting at its outer end a nut 23 and a locking washer 24 keyed to the bolt to prevent relative rotation. The washer has peripheral projections one of which is upturned to engage in one of a plurality of recesses in the nut. The recesses of the nut are so spaced apart in relation to the projections that a fine adjustment of the nut may be made before it is locked in position by engagement of a projection in the corresponding recess, thus allowing fine adjustment of the pressure between the blades. The bushes are spaced radially from the bolt to provide a housing 25 therebetween for a helical spring 26, the ends of which are tensioned and engage in apertures 21b, 22b at the ends of the bushes to urge the blades towards the open position.

The flanged ends of the bushes are non-circular and engage in non-circular recesses in the blade supporting members. Thus, in fitting the pivot assembly, before attaching the locking washer and nut, the adjacent bush may be rotated slightly to pre-tension, the spring before being pressed home into the recess in the blade supporting member. As an alternative to non-circular flanges on the bushes, circular flanges may be provided, a key being provided on the surface of the bush below the flange for engagement in a keyway in the adjacent supporting member.

In this embodiment, as seen best in FIG. 5 the portion of the first blade is enlarged in the vicinity of the bearing to provide a part circular portion 11b facing the handle, this portion being arranged to move in a corresponding recess in the handle of the second blade. In order to prevent movement of the blades beyond certain limiting positions, interconnected slots or keyways 30, 31 are formed in the periphery of the circular portion of the first blade to be engaged by a detent 32 which is movable into or out of the recess or keyway and is mounted on the handle of the second blade.

In order to hold the blades in the closed position and to allow them when desired to open to an intermediate position or to a fully open position, a first deep recess 30 is formed in the periphery of the circular portion from which a shallower key way 31 extends along a portion of the periphery which subtends an angle, equal to the desired limited opening angle, at the bearing axis. Thus when the detent is engaged in the deep recess 30 the blades are locked in the closed position, but when retracted so that it extends only into the keyway 31, the blades may be open until the detent 32 engages against the shoulder 31a at the end of the keyway which corresponds to the mid-open position of the blades. On retracting the detent wholly from the keyway 31 the blades may then open to the full position which may be determined in any conventional manner. The detent may be moved for example by means of a cam operated mechanism or a rack and pinion or similar mechanism. In either case the mechanism may be operated by means of a thumb lever 33 pivoted on one side of the second handle.

In the case of the rack and pinion mechanism, FIGS. 5 and 6, the detent 32 is formed on one end of a slide member 34 which is slidable longitudinally within the handle 16 and on one side has a recess 34a which is engaged by a gear tooth or projection 35 mounted on the axis of the thumb lever 33. Thus on rotation of the thumb lever, the slide member moves the detent into and out of the recess or key way in the blade supporting member.

The thumb lever is preferably arranged to locate positively in any one of the three positions for holding the blades closed or allowing them to open under the action of the spring to the mid or fully open position. This is effected by means of a spring loaded ball 36, FIG. 6, supported in the handle 16 and urged to engage corresponding recesses 33a spaced apart in the thumb lever along an arc about its pivotal axis.

In the case of the cam mechanism, FIGS. 7, 8 and 9, a circular disc 40 housed within the handle 16 is secured eccentrically on the axis of the thumb lever 33. Fitting around the disc is an annulus 41 which is movable in an enlarged recess lying in the plane of the disc and is provided with a radially outwardly extending detent which passes through guides which prevent it from rotating about the axis of the thumb lever. As the thumb lever is rotated, the eccentric action causes the detent to move towards or away from the pivot bearing and thus into or out of the recess or keyway in the blade 11.

Although the the invention has been described in relation to pruning shears, it is clearly applicable to other devices which open and close by pivotal movement, particularly those in which blades or handles are spring urged apart.

I claim:

1. The combination which comprises a pair of members, means pivotally interconnecting said members for relative movement about an axis passing through said members, and means for varying the angle of permissible relative movement of said members, comprising means defining a slot in one of said members, the depth of said slot varying in steps along its length, an elongate retaining device in the other of said members, means mounting said retaining device for movement into and out of said slot, and means for controlling the depth to which said retaining device extends into said slot, said controlling means comprising an operating device, means mounting said operating device for pivotal movement in said other member, means connecting said operating device to said retaining device to translate rotational movement of the operating device into longitudinal movement of the retaining device, and spring-urged means positively holding said operating device in any one of a plurality of predetermined rotational positions.

2. The combination according to claim 1 including a projection on one of said devices which engages in a recess in the other of said devices, pivotal movement of said operating device effecting longitudinal movement of said retaining device.

3. The combination according to claim 1 wherein said retaining device comprises an annulus, a projection extending from said annulus movable into and out of said recess, and said operating device comprises a rotor which fits within said annulus and is movable about an eccentric axis to effect longitudinal movement of said projection.

4. The combination which comprises a pair of members, means pivotally interconnecting said members and means movable between a first position in which said movable means lock said members against relative movement, a secnod position in which said members can be moved over a first range of angular movement, and a third position in which said members can be moved over a second range of angular movement which is greater than the first said range of movement, one of said members having a slot formed therein extending about the axis of relative movement of the members, the depth of said slot being stepped along its length, said movable means being located in the other of said members and comprising a detent movable into and out of said slot, an operating device, means pivotally mounting said operating device for rotation in said other member, means interconnecting said operating device with said detent to translate pivotal movement of the operating device into movement of said detent into and out of said slot, and spring-urged means positively holding said operating device in any one of three pivotal position, each corresponding to one of said first, second and third positions.

5. The combination according to claim 4 wherein said interconnecting means comprise a tooth on said operating device and means defining a recess in said detent, said tooth engaging in said recess.

6. The combination according to claim 4 wherein said interconnecting device comprises an annulus from which said detent extends in a radially outward direction, a disc fitted within said annulus and means connecting said disc to said operating device for rotation therewith about an axis which is eccentric with respect to said disc.

7. A secateur or pruning shear comprising two pivotally connected blade-carrying members, one of said members having a slot extending angularly about the pivotal axis, the depth of the slot being stepped along its length, the other of said members supporting a retaining device which is slidable longitudinally to extend to a selected depth into said slot to vary the angular range of possible movement of said member, an operating device pivotally mounted on said other member, a tooth on said operating device, said retaining device having a recess for receiving said tooth therein whereby pivotal movement of said operating device moves said retaining device along its length.

8. A secateur or pruning shear comprising two pivotally connected blade-carrying members, one of said members having a slot extending angularly about the pivotal axis, the depth of the slot being stepped along its length, the other of said members supporting a retaining device which is slidable longitudinally to extend to a selected depth into said slot to vary the angular range of possible movement of said members, an operating device pivotally mounted on said other member, a tooth on said operating device, said retaining device having a recess for receiving said tooth therein whereby pivotal movement of said operating device moves said retaining device along its length, and including a device for positively locating said operating device in each of a number of positions.

9. The combination according to claim 8 wherein said locating device comprises a spring urged detent mounted in the member supporting the operating device and engageable in any of a plurality of recessed portions of the operating device.

References Cited in the file of this patent

UNITED STATES PATENTS 2,821,018 Schwieso _____ Jan. 28, 1958